US011124621B2

(12) United States Patent
Weinrich et al.

(10) Patent No.: US 11,124,621 B2
(45) Date of Patent: Sep. 21, 2021

(54) PROCESS FOR PREPARING A POROUS MATERIAL

(71) Applicant: BASF SE, Ludwigshafen am Rhein (DE)

(72) Inventors: Dirk Weinrich, Lemförde (DE); Wibke Loelsberg, Ludwigshafen am Rhein (DE); Marc Fricke, Lemförde (DE); Gimmy Alex Fernandez Ramirez, Ludwigshafen am Rhein (DE); Volker Vogelsang, Lemfoerde (DE); Alberto Bueno Morales, Hamburg (DE); Raman Subrahmanyam, Hamburg (DE); Pavel Gurikov, Hamburg (DE); Ilka Selmer, Hamburg (DE); Irina Smirnova, Hamburg (DE)

(73) Assignee: BASF SE, Ludwigshafen am Rhein (DE)

(*) Notice: Subject to any disclaimer, the term of this patent is extended or adjusted under 35 U.S.C. 154(b) by 229 days.

(21) Appl. No.: 16/493,631

(22) PCT Filed: Apr. 13, 2018

(86) PCT No.: PCT/EP2018/059517
§ 371 (c)(1),
(2) Date: Sep. 12, 2019

(87) PCT Pub. No.: WO2018/189366
PCT Pub. Date: Oct. 18, 2018

(65) Prior Publication Data
US 2020/0071484 A1    Mar. 5, 2020

(30) Foreign Application Priority Data

Apr. 13, 2017 (EP) ..................... 17166524

(51) Int. Cl.
| | |
|---|---|
| *C08J 9/00* | (2006.01) |
| *B29C 67/20* | (2006.01) |
| *C08J 9/12* | (2006.01) |
| *C08J 9/28* | (2006.01) |
| *B29K 105/00* | (2006.01) |
| *B29L 7/00* | (2006.01) |

(52) U.S. Cl.
CPC ............ *C08J 9/283* (2013.01); *B29C 67/202* (2013.01); *C08J 9/122* (2013.01); *B29K 2105/0061* (2013.01); *B29K 2995/0015* (2013.01); *B29L 2007/002* (2013.01); *C08J 2201/0482* (2013.01); *C08J 2203/06* (2013.01); *C08J 2205/02* (2013.01); *C08J 2375/04* (2013.01)

(58) Field of Classification Search
CPC .... C08J 9/283; C08J 9/122; C08J 2201/0482; C08J 2203/06; C08J 2205/02; C08J 2375/04; C08J 2305/04; C08J 9/28; B29C 67/202; B29K 2105/0061; B29K 2995/0015; B29L 2007/002
See application file for complete search history.

(56) References Cited

U.S. PATENT DOCUMENTS

| | | |
|---|---|---|
| 6,300,385 B1 | 10/2001 | Hashida et al. |
| 2003/0109421 A1 | 6/2003 | Palakodaty et al. |
| 2008/0152715 A1 | 6/2008 | Shin et al. |
| 2017/0081494 A1 | 3/2017 | Fricke et al. |

FOREIGN PATENT DOCUMENTS

| | | | |
|---|---|---|---|
| CA | 2949307 A1 * | 11/2015 | ............ C08J 9/0066 |
| EP | 0 995 773 A2 | 4/2000 | |
| EP | 1 199 280 A1 | 4/2002 | |
| GB | 2 322 326 A | 8/1998 | |
| WO | WO 00/24799 A1 | 5/2000 | |
| WO | WO 02/32462 A1 | 4/2002 | |
| WO | WO 2007/013881 A2 | 2/2007 | |
| WO | WO 2009/016677 A2 | 2/2009 | |
| WO | WO 2015/177081 A1 | 11/2015 | |
| WO | WO 2017/050679 A1 | 3/2017 | |

OTHER PUBLICATIONS

International Search Report dated May 9, 2018 in PCT/EP2018/059517 filed Apr. 13, 2018.
International Preliminary Report on Patentability dated Jun. 28, 2018 in PCT/EP2018/059517 filed Apr. 13, 2018.
Said Al-Hamimi, et al., "Carbon Dioxide Expanded Ethanol Extraction: Solubility and Extraction Kinetics of α-Pinene and cis-Verbenol," Analytical Chemistry, vol. 88, 2016, pp. 4336-4345.

* cited by examiner

*Primary Examiner* — Kara B Boyle
(74) *Attorney, Agent, or Firm* — Grüneberg and Myers PLLC

(57) ABSTRACT

The present invention is directed to a process for preparing a porous material, at least comprising the steps of providing a gel comprising a solvent (S), wherein the solvent (S) has a volume (V1), pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1); removing supernatant liquid, and drying the gel. The present invention further is directed to the porous material obtained or obtainable according to the process as such as the use of the porous material according to the invention in particular for medical, biomedical and pharmaceutical applications or for thermal insulation.

12 Claims, 10 Drawing Sheets

(a)

(b)

(c)

(d)

(a)

(b)

(c)

(d)

PROCESS FOR PREPARING A POROUS MATERIAL

The present invention is directed to a process for preparing a porous material, at least comprising the steps of providing a gel comprising a solvent (S), wherein the solvent (S) has a volume (V1), pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1); removing supernatant liquid, and drying the gel. The present invention further is directed to the porous material obtained or obtainable according to the process as such as well as the use of the porous material according to the invention in particular for medical, biomedical and pharmaceutical applications or for thermal insulation.

Porous materials such as organic or inorganic aerogels are suitable for various applications. Porous materials having pores in the size range of a few microns or significantly below and a high porosity of at least 70% are for example particularly good thermal insulators on the basis of theoretical considerations.

Organic and inorganic aerogels and xerogels as well as processes for their preparation are known from the state of the art. Such porous materials having a small average pore diameter can be, for example, in the form of aerogels or xerogels which are produced with a sol-gel process and subsequent drying. In the sol-gel process, a sol based on a reactive gel precursor is first produced and the sol is then gelled by means of a crosslinking reaction to form a gel. To obtain a porous material, for example an aerogel, from the gel, the liquid has to be removed. This step will hereinafter be referred to as drying in the interests of simplicity.

It is generally known that gel monoliths or particles based on organic (e.g. PU) or inorganic (e.g. silica) precursors can be dried via supercritical extraction (i.e. using a medium in the supercritical state, e.g. CO2) to obtain organic, inorganic or hybrid aerogels.

Speaking in general terms, to remove the solvent from a gel via supercritical extraction, the gel is first placed in an autoclave and the autoclave is pressurized with CO2 to reach pressure and temperature above the mixture critical point of the solvent CO2 system ("pressurization"). The system consists initially of two mobile phases (liquid, gaseous, both containing solvent and CO2) and then transitions to a single phase (supercritical). At any point during or after the pressurization, continuous pumping of CO2 through the autoclave is started to gradually remove the solvent from the gel ("supercritical extraction" or "supercritical drying"). After sufficient removal of solvent from the gel, the autoclave is depressurized ("depressurization") and the aerogel is obtained.

EP 1199280 A1 discloses a process for the preparation of metal chalcogenides from solution or suspension via atomizing into a CO2 containing autoclave with pressures from 1-50 MPa and a protic solvent. CO2 here acts as an acid in the protic solvents required for generating the final products via reduction, oxidation or disproportionation. The precipitate, which is formed on the surface of inert support material particles, is then recovered by stepwise extracting the solvent with supercritical $CO_2$.

US 2008/0152715 discloses the preparation of nanoparticulate therapeutic agents by spraying a solution of vitamin K and a biodegradable polymer into a reactor containing supercritical CO2. The bipolar polymer is essential as a surfactant to prevent flocculation of the particles, which are precipitated by rapidly blending the solvent and supercritical CO2. Complete stepwise extraction of solvent is necessary to prevent the particles from re-dissolving in residual solvent, prior to collecting the powder-like product.

WO 2002/032462 A1 discloses a process for preparing very fine particles of an active substance and a cyclodextrine as a host molecule being dissolved in an organic solvent. The solutions are brought in contact with supercritical $CO_2$ right before entering the atomizing chamber via an orifice to induce precipitation by anti-solvent effect. After purging the chamber with fresh CO2 and depressurizing the particles can be recovered from the filter bed.

GB 2322326 discloses a process for preparing fine particles of nicotinic acid using solution enhanced dispersal by supercritical fluids (SEDS) in a dual jet mode with two opposing inlet nozzles. One nozzle sprays a stream of supercritical CO2 and a stream of nicotinic acid in ethanol in parallel to each other while a second nozzle sprays supercritical CO2 in direction of the first nozzle. The nozzle diameter determines the particle size. Here, supercritical CO2 is used to extract the substance from the solvent and to prepare particulate a material thereof.

US 2003/109421 discloses a process for preparing particles of temperature sensitive substances by a solvent anti-solvent extraction process. A solution or suspension of the target substance enters the particle formation vessel through a first location and a supercritical anti-solvent enters the same vessel through a second location further downstream at a distinctive angle allowing the anti-solvent to extract the solvent in order to promote particle formation. The particle formation vessel is kept under a temperature and pressure above the critical values of the anti-solvent.

Methods using gas expanded liquids are also known from the state of the art. WO 2007/013881 A2 discloses a process for the preparation of nanoparticles using gas expanded liquids. In WO 2009/016677 A2, a continuous process for the production of microspheres using gas expanded liquids is disclosed. Furthermore, Al-Hamimi et al (Anal. Chem. 2016, 4336-4345) describe the use of 002-expanded liquids in extraction processes.

The general literature consensus sees supercritical drying of gel monoliths as based on diffusive processes, which are also the rate-limiting factor. Hence the highest possible temperatures are supposed to be beneficial as diffusive processes are strongly temperature dependent, as long as the gel is not negatively affected. Thus, with rising temperature the supercritical drying phase can be shortened while removing the same amount of solvent from the gel.

According to the state of the art the fastest possible pressurization to the target supercritical drying pressure is considered advantageous in order to switch from pressurization to supercritical drying as early as possible thus reducing overall process time.

It was therefore an object of the invention to provide a process for the preparation of porous material with high porosity, with reduced production time. It was a further object of the invention to provide a process for the preparation of porous material with high porosity, with reduced production time and simple apparatuses.

According to the present invention, this object is achieved by a process for preparing a porous material, at least comprising the steps of:
  a) providing a gel comprising a solvent (S), wherein the solvent (S) has a volume (V1),
  b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);

c) removing supernatant liquid, d) drying the gel.

It has been surprisingly found that a substantive amount of the solvent comprised in a given gel can be removed using the process according to the present invention prior to the actual drying step. This allows to reduce the time required for the drying.

It was found that during pressurization CO2 solubilizes in the solvent contained in the gel leading to an increase of its volume forming a gas-expanded liquid. The increasing volume of this solvent-CO2 liquid phase leads to expulsion of excess liquid phase from the gel. This excess liquid phase is accumulated and can be removed easily, preferably during the pressurization process itself, before the drying.

Furthermore, it was found that a large proportion of solvent can be expelled with the liquid phase from the gel. Furthermore, it was found that when employing lower temperatures and pressures, larger amounts of liquid phase (and a higher proportion of solvent) are expelled from the gel within the same time. Furthermore, it was found that lower pore size of the gel leads to slower expulsion of liquid phase from the gel. It was also found that a lower thickness of the gel leads to faster expulsion of liquid phase from the gel.

The process according to the present invention comprises steps a) to d). According to step a), a gel comprising a solvent (S) is provided, wherein the solvent (S) has a volume (V1). The nature of the gel can vary. It is possible that an organic gel is provided but also inorganic gels can be subjected to the process according to the present invention. Suitable methods to prepare organic or inorganic gels are known to the person skilled in the art. Preferably, the gel is an organic gel according to the present invention. The size of the gel may also vary as long as suitable apparatuses are available to apply the pressure and temperature required. Preferably, the gel is provided in the form of a monolithic block.

In principle, the process does not depend on the gel chemistry. Thus, according to the present invention, any organic or inorganic gel can be used in the process, for example organic gels, such as gels based on synthetic polymers or biopolymers, or inorganic gels.

Therefore, according to a further embodiment, the present invention is also directed to the process as disclosed above, wherein the gel is an organic gel.

According to a further embodiment, the present invention is also directed to the process as disclosed above, wherein the gel is provided in the form of a monolithic block. In principle, any gel can be subjected to the process of the present invention. The gel may for example have a thickness in the range of from 5 to 20 mm, preferably in the range of from 5 to 15 mm. In case the gel is used in the form of particles, the average diameter of the particles may be in the range of from 5 to 20 mm, preferably in the range of from 5 to 15 mm.

According to the present invention, the gel preferably has a porosity in the range of from 75 to 99%. According to the present invention, the porosity of a gel is defined as the fraction of void space, i.e. the volume of the fluid, of the volume of the solid.

The gel is the pressurized with carbon dioxide at a temperature and a pressure at which carbon dioxide solubilizes in the solvent (S) according to step b) of the process of the present invention, forming a gas-expanded liquid (EL), wherein the gas-expanded liquid (EL) has a volume (V2) and (V2) is greater than (V1). According to step b), a volume (V3) which is the difference of (V2) and (V1) of a supernatant liquid is formed. The supernatant liquid is part of the gas-expanded liquid formed in step b).

In principle, any solvent can be used as long as it is miscible with carbon dioxide or has a sufficient boiling point which allows for removal of the solvent from the resulting gel. Generally, the solvent will be a low molecular organic compound, i.e. an alcohol having 1 to 6 carbon atoms, preferably 2 to 4, although other liquids known in the art can be used. Possible solvents are, for example, ketones, aldehydes, alkyl alkanoates, amides such as formamide, N-methylpyrollidone, N-ethylpyrollidone, sulfoxides such as dimethyl sulfoxide, aliphatic and cycloaliphatic halogenated hydrocarbons, halogenated aromatic compounds and fluorine-containing ethers. Mixtures of two or more of the abovementioned compounds are likewise possible. Examples of other useful liquids include but are not limited to: ethyl acetate, ethyl acetoacetate, acetone, dichloromethane, iso-propanol, methylethylketone, tetrahydrofurane, propylenecarbonate, and the like.

Further possibilities of solvents are acetals, in particular diethoxymethane, dimethoxymethane and 1,3-dioxolane.

Dialkyl ethers and cyclic ethers are likewise suitable as solvent. Preferred dialkyl ethers are, in particular, those having from 2 to 6 carbon atoms, in particular methyl ethyl ether, diethyl ether, methyl propyl ether, methyl isopropyl ether, propyl ethyl ether, ethyl isopropyl ether, dipropyl ether, propyl isopropyl ether, diisopropyl ether, methyl butyl ether, methyl isobutyl ether, methyl t-butyl ether, ethyl n-butyl ether, ethyl isobutyl ether and ethyl t-butyl ether. Preferred cyclic ethers are, in particular, tetrahydrofuran, dioxane and tetrahydropyran.

Aldehydes and/or ketones are particularly preferred as solvent. Aldehydes or ketones suitable as solvent are, in particular, those corresponding to the general formula $R^2$—(CO)—$R^1$, where $R^1$ and $R^2$ are each hydrogen or an alkyl group having 1, 2, 3, 4, 5, 6 or 7 carbon atoms. Suitable aldehydes or ketones are, in particular, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methacrolein, crotonaldehyde, furfural, acrolein dimer, methacrolein dimer, 1,2,3,6-tetrahydrobenzaldehyde, 6-methyl-3-cyclohexenaldehyde, cyanoacetaldehyde, ethyl glyoxylate, benzaldehyde, acetone, diethyl ketone, methyl ethyl ketone, methyl isobutyl ketone, methyl n-butyl ketone, methyl pentylketone, dipropyl ketone, ethyl isopropyl ketone, ethyl butyl ketone, diisobutylketone, 5-methyl-2-acetyl furan, 2-acetylfuran, 2-methoxy-4-methylpentan-2-one, 5-methylheptan-3-one, 2-heptanone, octanone, cyclohexanone, cyclopentanone, and acetophenone. The abovementioned aldehydes and ketones can also be used in the form of mixtures. Ketones and aldehydes having alkyl groups having up to 3 carbon atoms per substituent are preferred as solvent.

Further preferred solvents are alkyl alkanoates, in particular methyl formate, methyl acetate, ethyl formate, iso-propyl acetate, butyl acetate, ethyl acetate, glycerine triacetate and ethyl acetoacetate. Preferred halogenated solvents are described in WO 00/24799, page 4, line 12 to page 5, line 4.

Further suitable solvents are organic carbonates such as for example dimethyl carbonate, diethyl carbonate, ethylene carbonate, propylene carbonate or butylene carbonate.

In many cases, particularly suitable solvents are obtained by using two or more completely miscible compounds selected from the abovementioned solvents.

Therefore, according to a further embodiment, the present invention is also directed to the process as disclosed above, wherein the solvent (S) is selected from the group consisting of alcohols, ketones, aldehydes, alkyl alkanoates, amides, sulfoxides, aliphatic and cycloaliphatic halogenated hydrocarbons, halogenated aromatic compounds, dialkyl ethers, cyclic ethers and fluorine-containing ethers, and acetals.

In step b), a gas-expanded liquid is formed by pressurizing the gel comprising the solvent (S) with carbon dioxide at a temperature and a pressure at which carbon dioxide solubilizes in the solvent (S). The critical temperature and pressure of carbon dioxide is fixed (T1) and (P1). The solvent critical temperature (T2) and pressure (P2) varies depending on the solvent or solvent mixture.

The pressure of the solvent—$CO_2$ mixture critical point (Pc, mix) depends on the temperature chosen between T1 and T2. The suitable ranges for temperature and pressure are for example between the critical temperature of carbon dioxide (T1) and the solvent (T2) and the pressure may be in the range between 0.1 Pc, mix and 0.99 Pc, mix depending on the temperature chosen. The temperature chosen is defined as temperature T in the context of the present invention.

Therefore, according to a further embodiment, the present invention is also directed to the process as disclosed above, wherein step b) is carried out at a temperature in the range between the critical point of carbon dioxide (T1) and the critical point of the solvent (T2) and more specifically in the lower temperature ranges of 31° C. to 90° C., preferably 31° C. to 60° C., more preferably 31° C. to 45° C. According to a further embodiment, the present invention is also directed to the process as disclosed above, wherein step b) is carried out at a temperature in the range of from 31° C. to 90° C.

Therefore, according to a further embodiment, the present invention is also directed to the process as disclosed above, wherein step b) is carried out at a pressure in the range of 0.1 Pc,mix and 0.99 Pc,mix, wherein Pc,mix is the pressure of the critical point of the solvent—carbon dioxide system at the temperature T. Preferably, the pressure is between 50 and 200 bar, more preferably between 50 and 100 bar. Therefore, according to a further embodiment, the present invention is also directed to the process as disclosed above, wherein step b) is carried out at a pressure in the range of from 50 to 200 bar.

In step b), the pressure can also be increased gradually from atmospheric pressure or a starting pressure up to the target pressure for a supercritical extraction in step d) within a certain time. Preferably, the pressure is increased from atmospheric pressure to 200 bar, in particular from 1 bar to 200 bar, more preferably from atmospheric pressure to 150 bar within 20 to 120 min or from 1 bar to 150 bar within 20 to 120 min, preferably over a time in the range of from 30 to 90 min, more preferable over a time in the range of from 30 to 90 min. The pressure can be controlled in any suitable manner and can be increased in intervals or gradually. Thus, step b) may comprise one or more phases wherein the pressure is increased gradually and one or more phases wherein the pressure is kept at a constant level.

Therefore, according to a further embodiment, the present invention is also directed to the process as disclosed above, wherein step b) comprises a phase wherein the pressure is gradually increased from atmospheric pressure to 150 bar over a time in the range of from 30 to 90 minutes, for example from 1 bar to 150 bar over a time in the range of from 30 to 90 minutes or from 50 bar to 150 bar over a time in the range of from 30 to 90 minutes.

The supernatant liquid is removed according to step c) of the process of the present invention. Suitable methods for removing the liquid are known to the person skilled in the art. It is also possible according to the present invention that the supernatant liquid is removed while it is forming, i.e. steps b) and c) of the process according to the present invention can be carried out simultaneously. Therefore, according to a further embodiment, the present invention is also directed to the process as disclosed above, wherein step b) and step c) are carried out simultaneously.

After removal of the supernatant liquid, the gel is dried according to step d) of the process of the present invention. In principle, any suitable method for drying gels can be used in the context of the process according to the present invention. It is for example possible to use the pressure and temperature previously applied to the gel to accelerate and/or improve the drying step. The liquid comprised in the gel may for example be converted into the gaseous state during the drying step. It is also possible to dry the gel using supercritical conditions according to the process of the present invention.

Therefore, according to a further embodiment, the present invention is also directed to the process as disclosed above, wherein the drying according to step d) is carried out by converting the liquid comprised in the gel into the gaseous state at a temperature and a pressure below the critical point of the liquid or the gas-expanded liquid comprised in the gel.

According to an alternative embodiment, the present invention is also directed to the process as disclosed above, wherein the drying according to step d) is carried out under supercritical conditions. For drying under supercritical conditions according to step (d) of the present invention, generally any method known to the person skilled in the art can be applied. Preferably, carbon dioxide is used for the supercritical liquid extraction according to step (d).

According to one specific embodiment of the present invention, it is for example possible that by e.g. simply using the $CO_2$ supply of the supercritical drying apparatus the autoclave can be pressurized initially to advantageously low pressure and temperature (e.g. 50 to 60 bar and room temperature) without pumping, heating or cooling, and optimal conditions for expulsion of a large amount of liquid phase from the gel are achieved, which can then easily be removed from the bottom of the autoclave. In this way, a high proportion of solvent is removed from the gel before supercritical drying requiring pumping, heating and cooling of $CO_2$ has even started and energy is saved. In addition, less solvent needs to be removed from the gel by subsequent supercritical drying.

The process of the present invention can also comprise further steps, for example suitable treatment steps.

The product obtained in the process of the present invention is a porous material with a porosity of preferably at least 70 vol. %, in particular an aerogel. The porous material may be a powder or a monolithic block. The porous material may be an organic porous material or an inorganic porous material.

Generally, for a powder, the size of the particles may vary depending on the nature of the particles and the intended use, for example the particle size of a powder is in the range from 0.5 µm to 2 mm, preferably in the range from 0.75 µm to 1.5 mm, in particular in the range from 1 µm to 1 mm. According to an alternative embodiment, the particle size of a powder may also be in the range from 1 mm to 20 mm, preferably in the range from 5 mm to 15 mm, in particular in the range from 5 mm to 10 mm In further embodiments, the porous material comprises average pore diameters from about 2 nm to about 2000 nm. In additional embodiments, the average pore diameters of dried gel materials may be about 4 nm, about 6 nm, about 8 nm, about 10 nm, about 12 nm, about 14 nm, about 16 nm, about 18 nm, about 20 nm, about 25 nm, about 30 nm, about 35 nm, about 40 nm, about 45 nm, about 50 nm, about 60 nm, about 70 nm, about 80 nm, about 90 nm, about 100 nm, about 200 nm, about 500 nm, about 1000 nm, or about 2000 nm. The size distribution of the pores of the porous material may be monomodal or multimodal according to the present invention.

In the context of the present invention, the surface area, the pore sizes as well as the pore volumes were measured by BET in accordance with ISO 9277:2010 unless otherwise noted. This International Standard specifies the determination of the overall specific external and internal surface area of disperse (e.g. nano-powders) or porous solids by measuring the amount of physically adsorbed gas according to the Brunauer, Emmett and Teller (BET) method. It takes account of the International Union for Pure and Applied Chemistry (IUPAC) recommendations of 1984 and 1994.

According to a further aspect, the present invention is also directed to a porous material, which is obtained or obtainable by the process according to the present invention.

The porous materials obtained or obtainable by the process of the present invention are suitable for different applications.

The present invention is also directed to the use of porous materials as disclosed above or a porous material obtained or obtainable according to a process as disclosed above as thermal insulation material or as core material for vacuum insulation panels.

The invention also relates to construction materials and vacuum insulation panels comprising the porous materials and the use of porous materials for thermal insulation. Preferably, the materials obtained according to the invention are used for thermal insulation especially in buildings, or for cold insulation, particularly in mobile, transportation applications or in stationary applications, for example in cooling devices or for mobile applications.

For mechanical reinforcement for certain applications fibers can be used as additives.

The materials used in thermal insulation materials are preferably used in the following fields of application: as insulation in hollow blocks, as core insulation for multi-shell building blocks, as core insulation for vacuum insulation panels (VIP), as the core insulation for exterior insulation systems, as insulation for cavity wall works, especially in the context of loose-fill insulation.

A further object of the present invention are molded articles, building blocks or modules, building systems and building composites which contain or consist of the porous material according to the present invention. Another object of the present invention are vacuum insulation panels which contain porous materials according to the present invention. Furthermore, the thermal insulation material and the porous materials are in particular suitable for the insulation of extruded hollow profiles, particularly as the core material for the insulation in window frames.

The thermal insulation material is for example an insulation material which is used for insulation in the interior or the exterior of a building or as wall cavity insulation. The porous material according to the present invention can advantageously be used in thermal insulation systems such as for example composite materials.

According to a further aspect, the present invention is also directed to the use of porous material, in particular an inorganic or organic porous material, as disclosed above or a porous material, in particular an inorganic porous material, obtained or obtainable by a process as disclosed above as catalyst support, for the preparation of sensors as additive for food applications or for medical, pharmaceutical and cosmetic applications. It can be preferable to use porous material based on biopolymers, more specifically polysaccharides, for some applications. Within cosmetic applications the porous material, in particular an inorganic or organic porous material, obtained or obtainable by the process of the present invention can be used for example as deodorant active agent which is one method for the treatment of human body odors. These can be provided in all forms which can be envisaged for a deodorant composition. It can be a lotion, dispersion as a spray or aerosol; a cream, in particular dispensed as a tube or as a grating; a fluid gel, dispensed as a roll-an or as a grating; in the form of a stick; in the form of a loose or compact powder, and comprising, in this respect, the ingredients generally used in products of this type which are well known to a person skilled in the art, with the proviso that they do not interfere with the aerogels in accordance with the invention.

The present invention is also directed to the use of porous materials as disclosed above or a porous material obtained or obtainable according to a process as disclosed above as thermal insulation material or for vacuum insulation panels. The thermal insulation material is for example insulation material which is used for insulation in the interior or the exterior of a building. The porous material according to the present invention can advantageously be used in thermal insulation systems such as for example composite materials.

According to a further embodiment, the present invention therefore is directed to the use of porous materials as disclosed above, wherein the porous material is used in interior or exterior thermal insulation systems.

The present invention includes the following embodiments, wherein these include the specific combinations of embodiments as indicated by the respective interdependencies defined therein.

1. Process for preparing a porous material, at least comprising the steps of:
    a) providing a gel comprising a solvent (S), wherein the solvent (S) has a volume (V1),
    b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
    c) removing supernatant liquid,
    d) drying the gel.
2. The process according to embodiment 1, wherein the gel is an organic gel.
3. The process according to embodiment 2, wherein the gel is provided in the form of a monolithic block.
4. The process according to any of embodiments 1 to 3, wherein the solvent (S) is selected from the group consisting of alcohols, ketones, esters, aldehydes, alkyl alkanoates, amides, sulfoxides, aliphatic and cycloaliphatic halogenated hydrocarbons, halogenated aromatic compounds, dialkyl ethers, cyclic ethers and fluorine-containing ethers, and acetals.
5. The process according to any of embodiments 1 to 4, wherein step b) is carried out at a temperature in the range between the critical point of carbon dioxide (T1) and the critical point of the solvent (T2).
6. The process according to any of embodiments 1 to 5, wherein step b) is carried out at a temperature in the range of from 31° C. to 60° C.
7. The process according to any of embodiments 1 to 6, wherein step b) is carried out at a pressure in the range of 0.1 Pc,mix and 0.99 Pc,mix, wherein Pc,mix is the pressure of the critical point of the solvent—carbon dioxide system at the temperature T.
8. The process according to any of embodiments 1 to 7, wherein step b) is carried out at a pressure in the range of from 50 to 100 bar.
9. The process according to any of embodiments 1 to 8, wherein step b) comprises a phase wherein the pressure is gradually increased from atmospheric pressure to 150 bar over a time in the range of from 30 to 90 minutes.
10. The process according to any of embodiments 1 to 8, wherein step b) comprises a phase wherein the pressure is gradually increased from 1 bar to 150 bar over a time in the range of from 30 to 90 minutes.
11. The process according to any of embodiments 1 to 8, wherein step b) comprises a phase wherein the pressure is gradually increased from 50 bar to 150 bar over a time in the range of from 30 to 90 minutes.
12. The process according to any of embodiments 1 to 8, wherein step b) comprises a phase wherein the pressure is gradually increased from 1 bar to 150 bar over a time in the range of from 30 to 60 minutes.
13. The process according to any of embodiments 1 to 8, wherein step b) comprises a phase wherein the pressure is gradually increased from 50 bar to 150 bar over a time in the range of from 30 to 60 minutes.
14. Process for preparing a porous material, at least comprising the steps of:
a) providing a gel comprising a solvent (S), wherein the solvent (S) has a volume (V1),
b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
c) removing supernatant liquid,
d) drying the gel,
wherein the gel is an organic gel.
15. Process for preparing a porous material, at least comprising the steps of:
a) providing a gel comprising a solvent (S), wherein the solvent (S) has a volume (V1),
b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
c) removing supernatant liquid,
d) drying the gel,
wherein the gel is provided in the form of a monolithic block.
16. Process for preparing a porous material, at least comprising the steps of:
a) providing a gel comprising a solvent (S), wherein the solvent (S) has a volume (V1),
b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
c) removing supernatant liquid,
d) drying the gel,
wherein the gel is an organic gel, and
wherein step b) is carried out at a temperature in the range between the critical point of carbon dioxide (T1) and the critical point of the solvent (T2).
17. Process for preparing a porous material, at least comprising the steps of:
a) providing a gel comprising a solvent (S), wherein the solvent (S) has a volume (V1),
b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
c) removing supernatant liquid,
d) drying the gel,
wherein the gel is an organic gel, and
wherein step b) is carried out at a temperature in the range of from 31° C. to 60° C.
18. Process for preparing a porous material, at least comprising the steps of:
a) providing a gel comprising a solvent (S), wherein the solvent (S) has a volume (V1),
b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
c) removing supernatant liquid,
d) drying the gel,
wherein the gel is an organic gel, and
wherein step b) is carried out at a pressure in the range of from 50 to 100 bar.
19. Process for preparing a porous material, at least comprising the steps of:
a) providing a gel comprising a solvent (S), wherein the solvent (S) has a volume (V1),
b) pressurizing the gel with carbon dioxide at a temperature and a pressure at which carbon dioxide solubilizes in the solvent (S) forming gas-expanded liquid (EL), wherein the gas-expanded liquid (EL) has a volume (V2) and (V2) is greater than (V1);
c) removing supernatant liquid,
d) drying the gel,
wherein the gel is an organic gel,
wherein step b) is carried out at a temperature in the range of from 31° C. to 60° C. and
wherein step b) is carried out at a pressure in the range of from 50 to 100 bar.
20. The process according to any of embodiments 1 to 19, wherein step b) and step c) are carried out simultaneously.
21. The process according to any of embodiments 1 to 20, wherein the drying according to step d) is carried out by converting the liquid comprised in the gel into the gaseous state at a temperature and a pressure below the critical point of the liquid or the gas-expanded liquid comprised in the gel.
22. The process according to any of embodiments 1 to 21, wherein the drying according to step d) is carried out under supercritical conditions.
23. A porous material, which is obtained or obtainable by the process according to any of embodiments 1 to 22.
14. The use of porous materials according to embodiment 23 or a porous material obtained or obtainable by the process according to any of embodiments 1 to 22 as thermal insulation material or for vacuum insulation panels.

Figure 1:
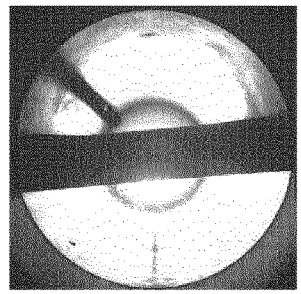
FIG. 1: shows pictures of solvent spillage of alginate gel recorded by camera in autoclave with two glass windows. The picture (a) was taken at t=0 min, P=0 bar; picture (b) was taken at t=10 min, P=99 bar; picture (c) was taken at t=30 min, P=99 bar; and picture (d) was taken at t=60 min; P=99 bar.
Figure 1:
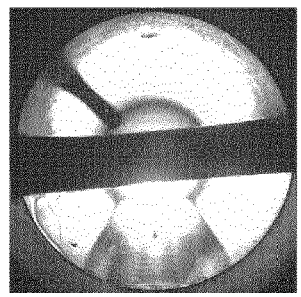
Figure 1:
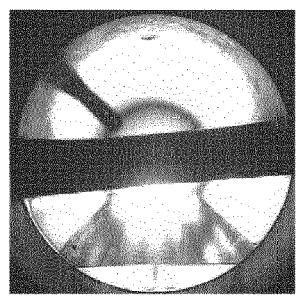
Figure 1:
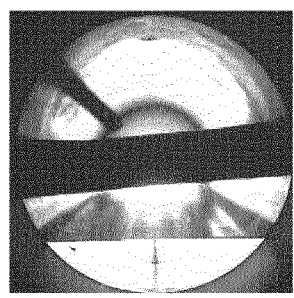
Figure 2:
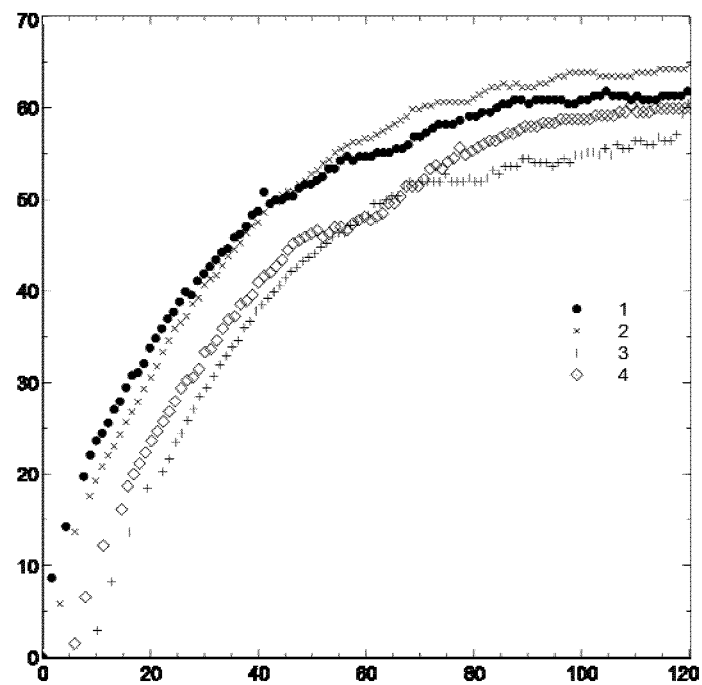
FIG. 2: shows a diagram of the solvent spillage during pressurization of alginate gels (y axis: % solvent removed; x axis: time in minutes; 1: 1.5% Na-alginate, T=35° C., p=67 bar; 2: 3.0% Na-alginate, T=35° C., p=67 bar; 3: 1.5% Na-alginate, T=60° C., p=99 bar; 4: 3.0% Na-alginate, T=60° C., p=99 bar)
Figure 3:
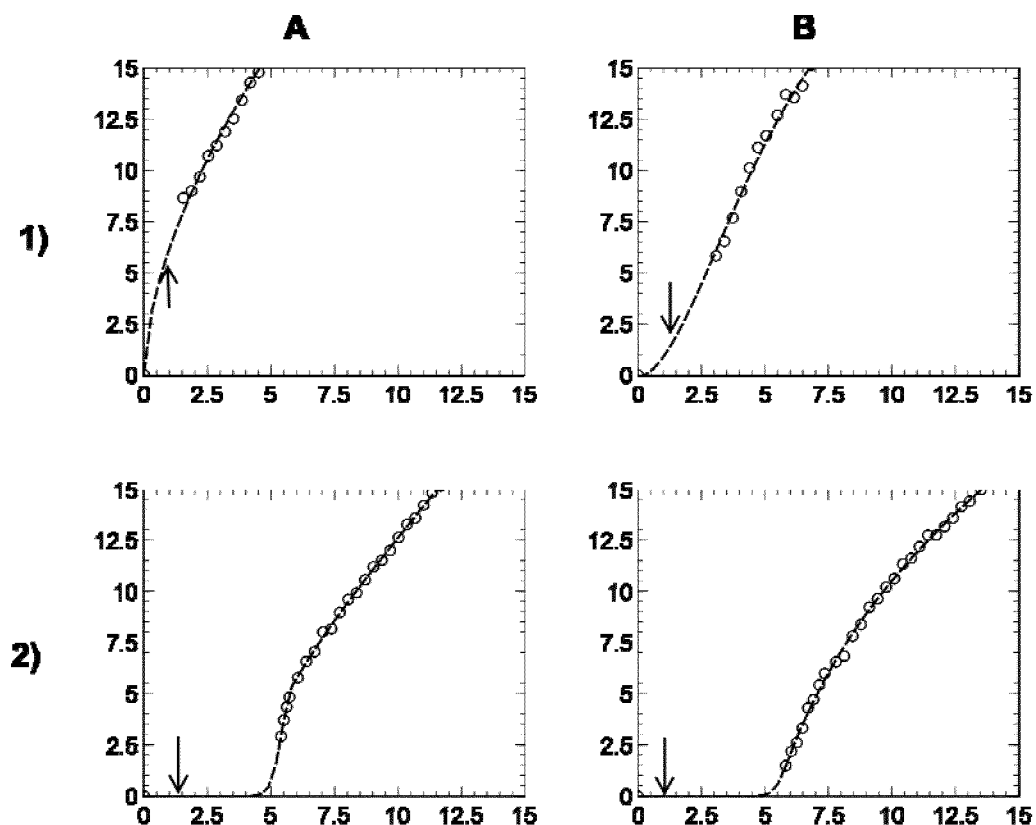
FIG. 3: shows a diagram of the solvent spillage during pressurization of alginate gels (y axis: % solvent removed; x axis: time in minutes; 1: T=35° C., 2: T=60° C., A: 1.5% Na-alginate, B: 3.0% Na-alginate; the arrow indicates end of pressurization)
Figure 4:
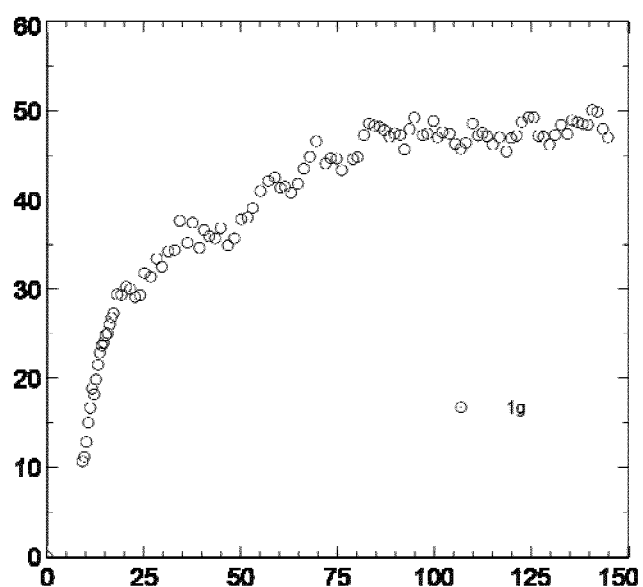
FIG. 4: shows a diagram of the solvent spillage during pressurization of silica gel (y axis: % solvent removed; x axis: time in minutes; 1 g: T=35° C., P=65 bar)
Figure 5:
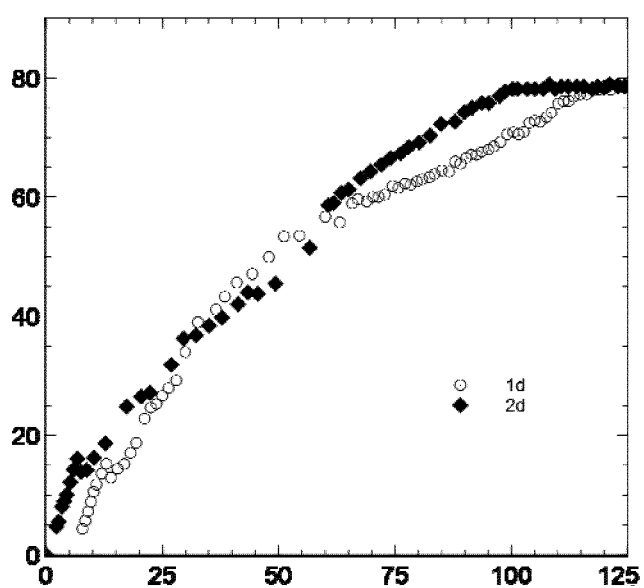
FIG. 5: shows a diagram of the solvent spillage during pressurization of polyurethane gel of thickness 15 mm (y axis: % solvent removed; x axis: time in minutes; 1d: T=60° C., P=90 bar; 2d: T=35° C., P=65 bar)
Figure 6:
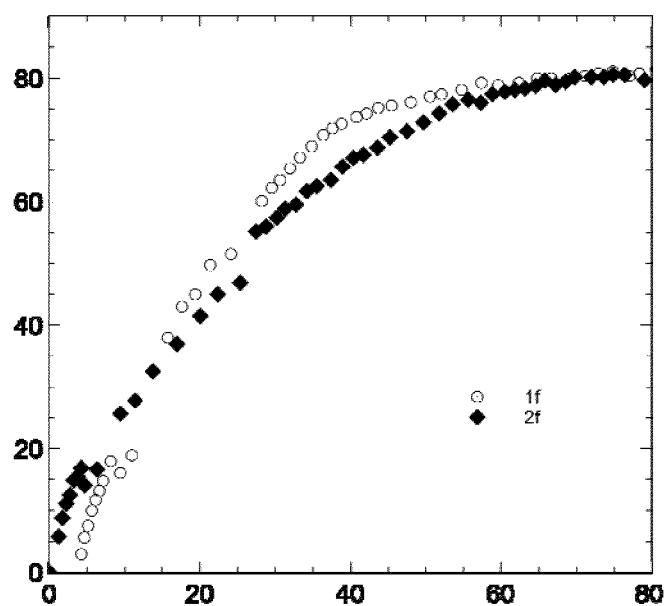
FIG. 6: shows a diagram of the solvent spillage during pressurization of polyurethane gel of thickness 9 mm (y axis: % solvent removed; x axis: time in minutes; 1f: T=60° C., P=90 bar; 2f: T=35° C., P=65 bar)

Examples will be used below to illustrate the invention.

EXAMPLES

1. Biopolymer Gel Based on Alginate:

Suspensions of Na-alginate/water/CaCO3 were prepared for two different Na-alginate concentrations: 1.5 wt. % and 3.0 wt. %, with a CaCO3 content of 0.36 g CaCO3 for each gram of Na-alginate. The suspension was sheared using an Ultra Turrax T45 and was left to rest for 15 min to allow the air trapped in the suspension to escape.

A fresh solution of GDL was prepared in water with a GDL amount of 0.64 g per gram of Na-alginate. The GDL solution was poured in the respective Na-alginate/water/CaCO3 suspension and sheared using the Ultra Turrax T45 mixer for 10 seconds followed by pouring 500 g of the suspension in polypropylene molds of 20 cm by 20 cm. The amount of water used for dissolving the GDL was chosen such as the final Na-alginate concentration was kept at 1.5 wt. % or 3.0 wt. %.

The gelation time was around 40 seconds and the gels were aged for 24 hours in the closed container. After aging the gels, they were cut into three equal slabs for solvent exchange.

The solvent exchange was done in increments of 20 wt. % ethanol after every 2 hours until a concentration of at least 99.0 wt. % (measured using Anton Paar DMA 4500 density meter) was obtained at equilibrium [5]. The solvent exchange was done in the same molds used for gelation and the slabs were turn over each solvent exchange cycle. The thickness of the slabs after solvent exchange was approximately 5 mm.

2. Organic Gel Based on Polyurethane:

In a polypropylene container, 48 g Lupranat® M200 (oligomeric MDI with an NCO content of 30.9 g per 100 g in accordance with ASTM D-5155-96 A, functionality in the range of 3 and a viscosity of 2100 mPa·s at 25° C. in accordance with DIN 53018) were dissolved under stirring in 200 g MEK at 20° C. leading to a clear solution. Similarly, 8 g MDEA (3,3'-5,5'-tetraethyl-4,4'-diaminophenylmethane), 4 g Ksorbate solution (20% potassium sorbate in monoethylene glycol) and 8 g n-butanol were dissolved in 220 g MEK to obtain a second solution. The solutions were combined in a rectangular container (20×20×5 cm height) by pouring one solution into the other, which led to a clear, homogeneous mixture of low viscosity. The container was closed with a lid and the mixture was gelled at room temperature for 24 h. The gel was cut into slabs of 9 mm and 15 mm thickness.

3. Inorganic Gel Based on Silica:

In a polypropylene container, 11.79 g tetraethyl orthosilicate, 2.61 g ethanol, 0.46 g distilled water and 0.06 g 1M HCl were stirred for 30 min. Similarly, 1.33 g 28-30% aq. ammonium hydroxide, 0.28 g distilled water and 2.61 g ethanol were stirred for 5 min in a second container, then 25.88 g ethanol were further added. The solutions were combined by pouring one solution into the other, stirring for 1 min and pouring into a container. The container was closed with a lid and the mixture was gelled at room temperature for 16 h. The obtained gel had a thickness of 10 mm.

4. Measurements

All the experiments were done using an autoclave equipped with two glass windows (FIG. 1). The capacity of the autoclave was 500 mL and it was positioned in a horizontal arrangement. The high-pressure carbon dioxide was liquefied using a refrigeration unit and supplied using an air operated pump, followed by heating the CO2. The temperature of the autoclave was controlled with an accuracy of ±3° C. using an external heating jacket connected to an on/off controller. The pressure inside the autoclave was controlled manually using a needle valve (±5 bar).

The gel slabs were preheated in an ethanol or MEK bath to 35° C. or 60° C. After an equilibration time of one hour, the slabs were weighed and immediately positioned inside the preheated autoclave. The slabs were positioned over a mesh located at the middle of the autoclave so as to leave the bottom half of the autoclave free for the accumulation of the spilled liquid from the gel (FIG. 1).

The autoclave was pressurized at a rate of 1 bar/s and the desired final pressure was kept constant. The amount of solvent mixture removed from the gel was measured using the digital camera (Logitech C920 HD Pro) and the white led fixed with a diffuser. Pictures every 5 seconds were taken and analyzed afterwards to determine the position of the liquid/gas interphase. The position of the interphase was used to calculate the volume of the spilled liquid using prior calibration data. After equilibrium of the system was reached (approximately 6 hours), the autoclave was depressurized and the obtained porous material was dried in an oven at 110° C. for 24 hours to obtain the weight of the polymer.

5. Effect of the Variation of the Drying Profiles

Figure 7:
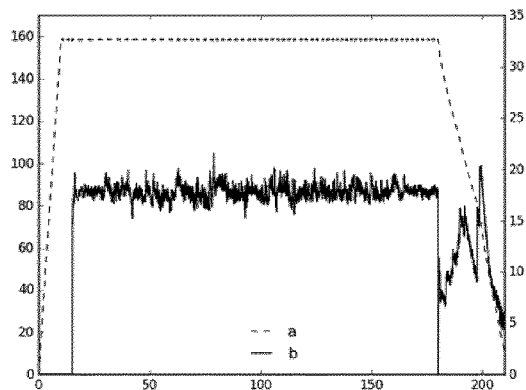
FIG. 7: shows the conditions different drying profiles for pressurization times of 10 (FIG. 7(a)), 30 (FIG. 7(b)), 60 (FIG. 7(c)) and 90 min (FIG. 7(d)) and a final pressure of 160 bar at a temperature of 60° C. Graph a indicates the pressure, graph b indicates the outflow rate (y axis: pressure in bar; x axis: time in minutes)
Figure 7:
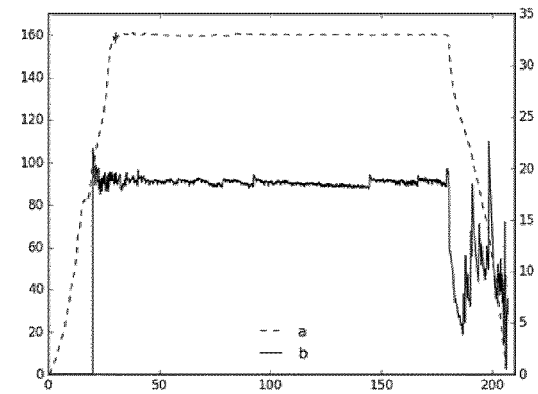
Figure 7:
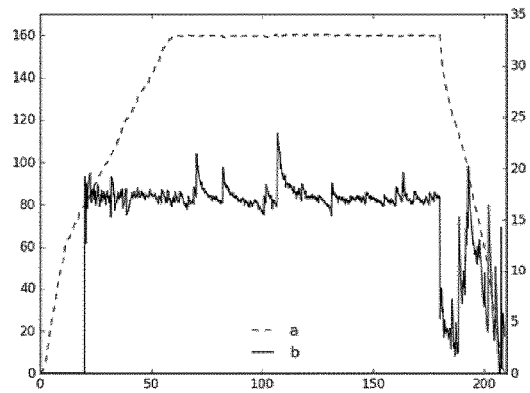
Figure 7:
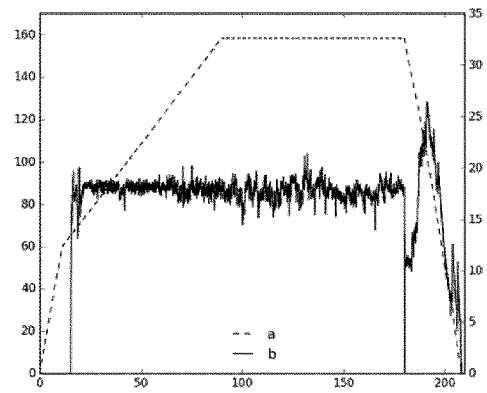

Example 1 was repeated using different drying profiles shown in FIG. 7. The pressurization time was set at 10, 30, 60 and 90 min. For all examples, the final pressure was 160 bar. The temperature was 60° C. and the outlet valve opening: 15 min.

Figure 8:
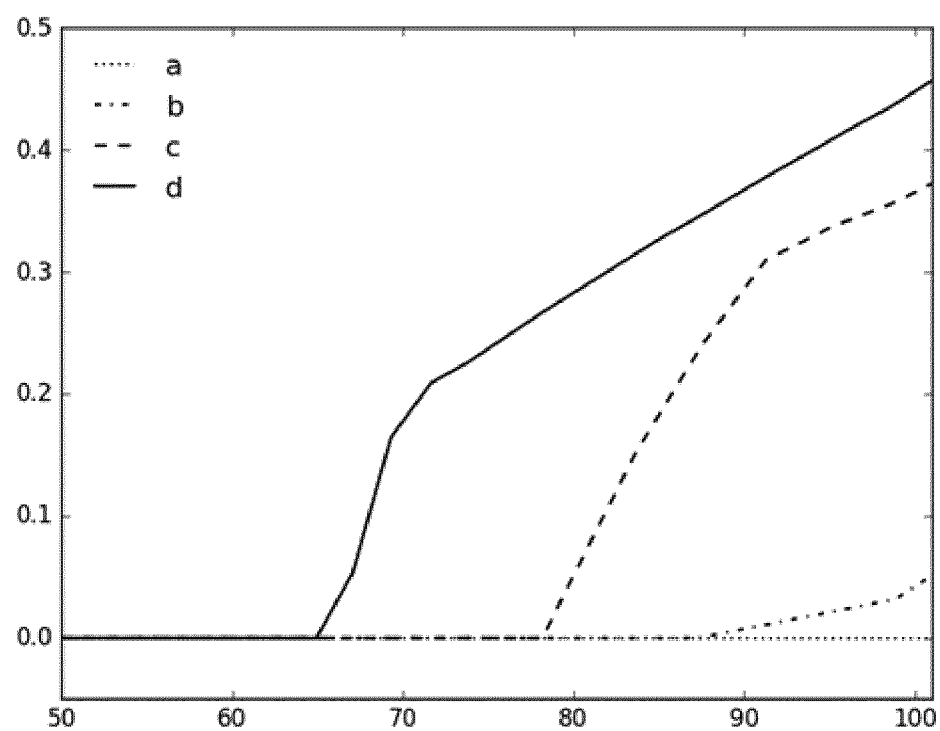
FIG. 8 shows a diagram of the Removal of solvent at subcritical conditions (y axis: normalized extraction; x axis: pressure in bar). Graph a shows the results for a pressurization of 10 minutes, graph b for a pressurization of 30 minutes, graph c for a pressurization of 60 minutes, and graph d for a pressurization of 90 minutes.

As shown in FIG. 8, it was possible to remove considerable amounts of solvent out of the gel before reaching supercritical conditions. The results are summarized in table 1.

TABLE 1

| Pressurization Time (min) | Subcritical Extraction (wt. %) |
|---|---|
| 10 | 0 |
| 30 | 5.3 |
| 60 | 37.2 |
| 90 | 45.8 |

Figure 9:
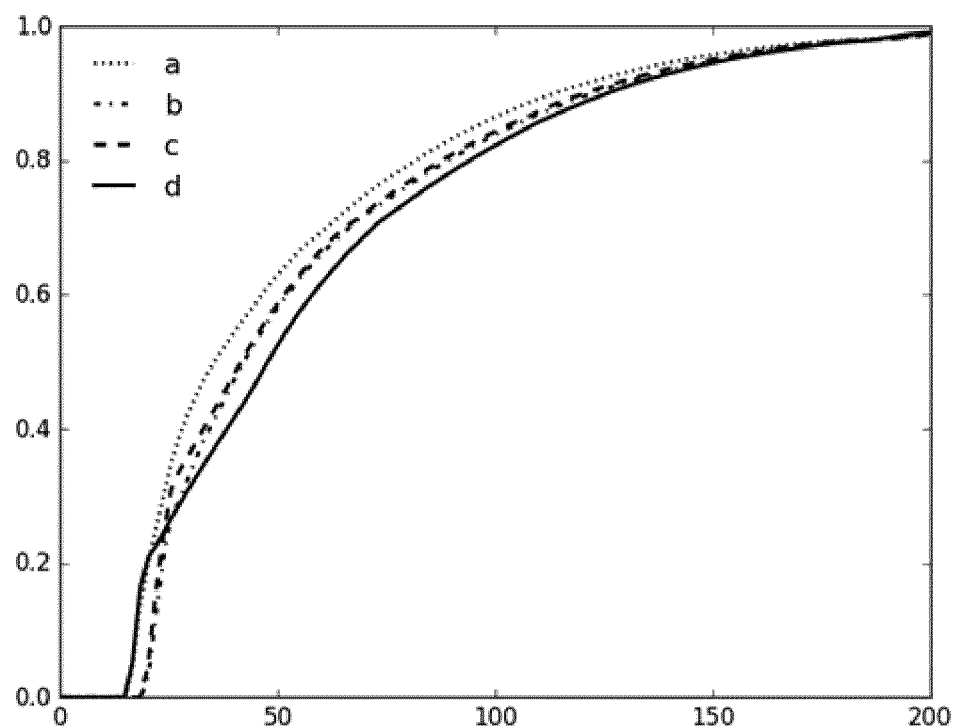
FIG. 9 shows a diagram of the comparison of slower pressurization vs. Faster pressurization (y axis: normalized extraction; x axis: time in minutes). Graph a shows the results for a pressurization of 10 minutes, graph b for a pressurization of 30 minutes, graph c for a pressurization of 60 minutes, and graph d for a pressurization of 90 minutes.

It was found that a slower pressurization has no negative effect on the drying kinetics compared to a faster pressurization (FIG. 9, table 2).

TABLE 2

| Pressurization Time (min) | Time for 98 wt. % of extraction* (min) |
|---|---|
| 10 | 181.2 |
| 30 | 186.4 |
| 60 | 187.8 |
| 90 | 186.7 |

Figure 10:
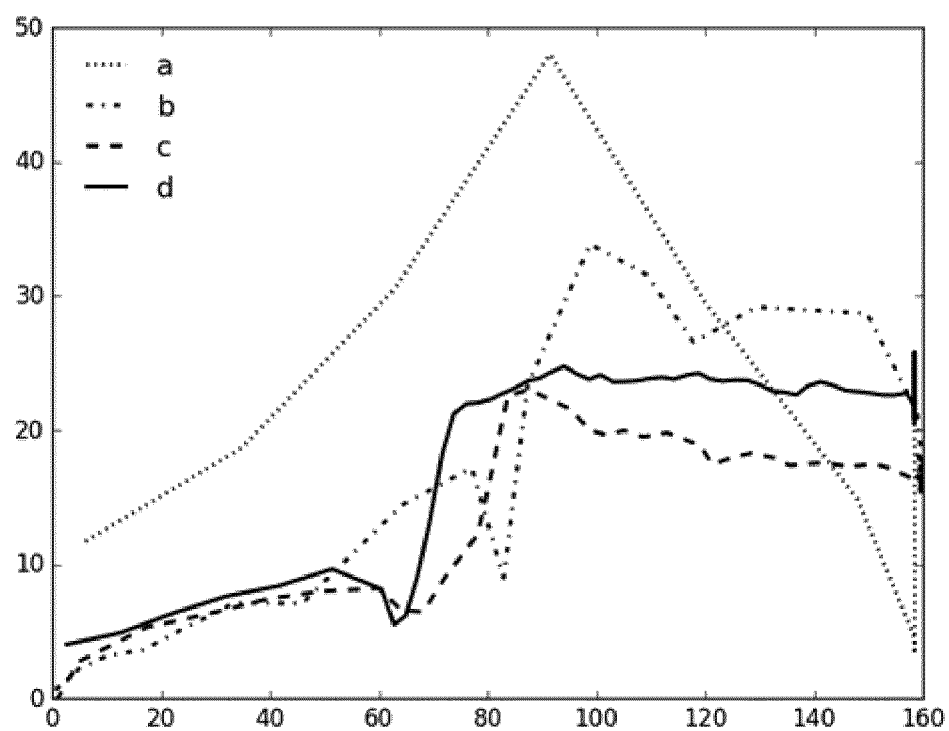
FIG. 10 shows a diagram of the Process compression requirements (y axis: CO2 Inflow in g/min; x axis: pressure in bar). Graph a shows the results for a pressurization of 10 minutes, graph b for a pressurization of 30 minutes, graph c for a pressurization of 60 minutes, and graph d for a pressurization of 90 minutes.

The results summarized in FIG. 10 and table 3 show that a slower pressurization has a clear advantage on the reduction of compression requirements which translates in energy savings and lower CAPEX.

TABLE 3

| Pressurization Time (min) | Max throughput difference, % |
|---|---|
| 10 | 0 |
| 30 | 29 |
| 60 | 52 |
| 90 | 48 |

The throughput difference is calculated according to formula (I):

$$diff. = \frac{Curve, n - Curve, 1}{Curve, 1} \qquad (I)$$

LITERATURE CITED

EP 1199280 A1
US 2008/0152715
WO 2002/032462 A1
GB 2322326
US 2003/109421
WO 2007/013881 A2
WO 2009/016677 A2
Al-Hamimi et al, Anal. Chem. 2016, 4336-4345

The invention claimed is:

1. A process for preparing a porous material, the process comprising:
   a) providing a gel comprising a solvent (S), wherein the solvent (S) has a volume (V1),
   b) pressurizing the gel with carbon dioxide at a temperature and a pressure at which carbon dioxide solubilizes in the solvent (S) forming a gas-expanded liquid (EL), wherein the gas-expanded liquid (EL) has a volume (V2) and (V2) is greater than (V1),
   wherein in b), a volume (V3) which is a difference of (V2) and (V1) of a supernatant liquid is formed;
   c) removing supernatant liquid, and
   d) drying the gel,
   wherein b) further is carried out at a temperature in a range of from 31° C. to 90° C.,
   wherein b) is carried out at a pressure in a range of from 0.1 Pc,mix to 0.99 Pc,mix, wherein Pc,mix is the pressure of the critical point of the solvent—carbon dioxide system at a temperature T, and
   wherein b) comprises a phase wherein the pressure is gradually increased from 1 to 150 bar over a time in a range of from 30 to 90 minutes.

2. The process of claim 1, wherein the gel is an organic gel.

3. The process of claim 2, wherein the gel is provided in the form of a monolithic block.

4. The process of claim 1, wherein the solvent (S) is selected from the group consisting of an alcohol, a ketone, an ester, an aldehyde, an alkyl alkanoate, an amide, a sulfoxide, an aliphatic halogenated hydrocarbon, a cycloaliphatic halogenated hydrocarbon, a halogenated aromatic compound, a dialkyl ether, a cyclic ether, a fluorine-comprising ether, and an acetal.

5. The process of claim 1, wherein b) is carried out at a temperature in a range between a critical point (T1) of carbon dioxide and a critical point (T2) of the solvent (S).

6. The process of claim 1, wherein b) is carried out at a temperature in a range of from 31° C. to 60° C.

7. The process of claim 1, wherein b) is carried out at a pressure in a range of from 50 to 100 bar.

8. The process of claim 1, wherein b) is carried out at a temperature in a range of from 31° C. to 60° C. and a pressure in a range of from 50 to 100 bar.

9. The process of claim 1, wherein during the phase wherein the pressure is gradually increased, the pressure is gradually increased from 50 to 150 bar over a time in a range of from 30 to 90 minutes.

10. The process of claim 1, wherein b) and c) are carried out simultaneously.

11. The process of claim 1, wherein the drying of d) is carried out by converting the liquid comprised in the gel into a gaseous state at a temperature and a pressure below the critical point of the liquid or the gas-expanded liquid (EL) comprised in the gel.

12. The process of claim 1, wherein the drying of d) is carried out under supercritical conditions.

* * * * *